United States Patent [19]

Hempell

[11] 4,443,815
[45] Apr. 17, 1984

[54] WIRED PROGRAM DISTRIBUTION SYSTEM TAMPER DETECTOR

[75] Inventor: L. Bruce Hempell, Almonte, Canada

[73] Assignee: Nabu Manufacturing Corporation, Almonte, Canada

[21] Appl. No.: 277,187

[22] Filed: Jun. 25, 1981

[30] Foreign Application Priority Data

Mar. 20, 1981 [CA] Canada ................... 373561

[51] Int. Cl.³ .................. H04N 7/16; H01H 9/00
[52] U.S. Cl. ................... 358/114; 358/86; 358/115; 361/194; 455/4
[58] Field of Search ............ 358/114, 115, 86; 455/4; 361/194, 160

[56] References Cited

U.S. PATENT DOCUMENTS

| | | | |
|---|---|---|---|
| 3,244,809 | 4/1966 | Fuller et al. .................. | 455/4 |
| 4,002,956 | 1/1977 | Minor et al. .................. | 361/194 |
| 4,286,288 | 8/1981 | Waldo .......................... | 358/114 |
| 4,313,132 | 1/1982 | Doles et al. .................. | 358/114 |

Primary Examiner—S. C. Buczinski
Attorney, Agent, or Firm—Laff, Whitesel, Conte & Saret

[57] ABSTRACT

A wired program distribution tamper detection circuit useful in CATV including pay T.V. systems which is connected in the subscriber drop cable between the trunk and a subscriber's pay T.V. security device, e.g. descrambler, filter, or converter, or T.V. set and cuts off the program signal in the event the cable is momentarily disconnected as would occur during tampering. The circuit detects an abnormal impedance, in its general form, or the interruption of a d.c. path through the cable, in its preferred embodiment, and inhibits the application of the signal upon such detection. A complaint by the subscriber thus effects an announcement of the tampering.

11 Claims, 3 Drawing Figures

WIRED PROGRAM DISTRIBUTION SYSTEM TAMPER DETECTOR

This invention relates to wired program distribution systems, and particularly to a subscriber interface connector circuit which detects and disconnects a subscriber drop which is being tampered with.

BACKGROUND OF THE INVENTION

Wired program distribution systems, such as CATV systems utilize trunks which carry program signals, and subscriber taps and drops are connected along the trunks. A typical system would have 4 or 6 subscriber drops connected to a distribution splitter which in turn is connected to the trunk tap. Each drop is connected into a subscriber's home. Typically each subscriber is charged a monthly rate, comprised of a base rate for a single signal outlet, and a monthly surcharge for each additional signal outlet in his home.

In addition, pay T.V. is passed down the cable, sometimes in scrambled form, and a descrambler or pay T.V. channel filter is used, associated with the subscriber drop, to provide pay T.V. services to the subscriber, for which he typically pays at a monthly rate. The filter is located either at the trunk pole, or at the subscriber's utility board in his home. The descrambler is usually located at the subscriber's T.V. set.

However cable T.V. operators have found that certain subscribers themselves connect additional outlets in their homes, without advising the operator, thus effectively stealing services by avoiding payment of the multiple outlet surcharge.

Some subscribers have also disconnected and by-passed the pay T.V. security device, such as the pay T.V. filter on the trunk pole or the descrambler at the T.V. set, or have connected their own pirate descrambler to the cable drop, thus effectively stealing pay T.V. program services.

SUMMARY OF THE INVENTION

The present invention is directed to apparatus which automatically detects tampering of the cable outlet by the subscriber, and immediately shuts down the provision of program service to the subscriber. The subscriber then must telephone the cable T.V. operator to complain or re-initiate service, and thereby himself announces the attempt at tampering. The cable T.V. operator can thus inspect the outlets in the subscriber's home or the pay T.V. security device, and can discuss the provision of services with the subscriber.

While the present specification describes the invention for use with a CATV distribution system, it is clear that the principles can be used with any wired distribution system, and the present specific design can be used with any system which uses an input which has a D.C. path between the input terminals, or to which an auxiliary D.C. path can be connected.

The invention is fabricated as a connector circuit which is connected in series with the drop between the distribution splitter and the subscriber's set (e.g. television set). It can be located in the subscriber's basement, utility room, in the distribution splitter housing, or anywhere along the program signal cable which is unique to a particular subscriber. However it usually will be located at the distribution splitter. In order to place the circuit in series with the drop cable, the drop from the trunk is connected to the present circuit and the present circuit is connected via a further cable to the subscriber's set. Accordingly the present circuit can be considered as a connector which contains or is comprised of the circuit of the invention.

In general, therefore, the invention is a connector circuit for a line signal feed to a subscriber comprising means for applying a line signal to a subscriber feed cable having a predetermined normal impedance between its conductors, a circuit for detecting an abnormal impedance between its conductors, and inhibiting means for inhibiting the application of the line signal to the cable upon detection of the abnormal impedance.

It will be understood that when the CATV operator connects the CATV outlet to the subscriber's television set, it usually remains undisturbed. However should the subscriber tamper with the outlet by disconnecting the outlet from the television set, or otherwise break the line feed, an open circuit on the drop will exist for at least a short period of time. This abnormally high impedance is sensed by the present invention which acts to immediately shut-down the signal line feed to the outlet.

The principles of the invention can also be applied by a person skilled in the art understanding this invention to the sensing of a short-circuit across the drop. Consequently if an attempt is made to defeat the detection system by short-circuiting across the terminals before removing them from the television set, the system will also shut down.

It should be noted that mere disconnection of the television set from the end of the cable should not necessarily result in shut-down of the signal supply feed, since certain subscribers may change television sets or temporarily disconnect the antenna terminals for various reasons. The input to the pay T.V. security device or channel converter thus provides the required input impedance including d.c. path whereby the signal feed will be maintained. The security device (e.g. a descrambler or converter), can of course be located at the subscriber's T.V. set or on his utility board, or anywhere along his drop, thus allowing the subscriber to disconnect his T.V. set from his local outlet, without shutting down service. Yet if he attempts to bypass the security device or converter on its trunk side in order to obtain service for which payment is required, the provision of program service is terminated.

If no security device is provided, an auxiliary termination can be used at the cable T.V. wall outlet, if desired.

Upon shut-down of the line feed, a serviceman must be sent to the subscriber's home, and according to the preferred embodiment of the invention is able to reestablish service by the mere push of a button (which of course is hidden within the connector housing).

The invention can thus be used in a CATV distribution system which includes a CATV feeder trunk, a plurality of subscriber drops connected to the trunk via individual connector circuits, each of the connector circuits being further connected to television set or security device antenna terminals having a d.c. path and predetermined impedance to CATV signals therebetween, each of the connector circuits including a CATV signal transmission path through a latching switch circuit. A circuit is provided for detecting interruption of the d.c. path and for operating the latching switch circuit to open the transmission path upon detection of the interruption.

While the preferred embodiment of the invention utilizes detection of the interruption of the d.c. path passing through the input circuit of the subscriber set or auxiliary impedance device, which interruption clearly varies the resistive component of the impedance (indeed, renders it infinite), it will become clear to a person skilled in the art that circuits using the principles of the invention can be designed which detect other impedance variations and in turn shut down the line feed.

The principles of the invention are illustrated in the following description of the invention, which includes a description of the preferred embodiment of the invention, with reference to the following drawings, in which:

BRIEF INTRODUCTION TO THE DRAWINGS

FIG. 1 schematically depicts a program distribution system utilizing the invention, FIG. 2 is a block schematic of the invention, and FIG. 3 is a schematic diagram of the preferred embodiment of the invention.

DESCRIPTION OF A PREFERRED EMBODIMENT

Figure 1:
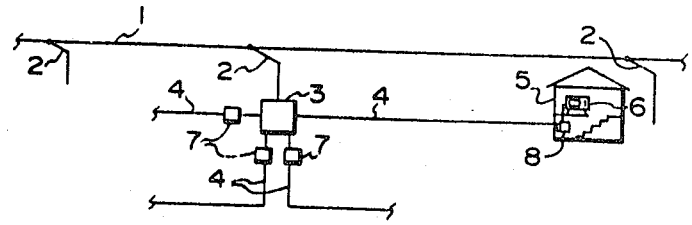

A portion of a program distribution system such as a CATV system is shown in FIG. 1, and includes a trunk 1 having numerous taps 2. Each tap is connected to a distribution splitter 3, to which, typically, four subscriber drops 4 are connected. Each subscriber drop is connected by the program distribution company within a subscriber's house 5 to a security device, a television set, f.m. receiver, etc., all of which will be generally referred to herein as a subscriber's set 6.

The connector circuit 8 of the present invention is connected in series with the subscriber's drop between the distribution splitter and the subscriber's set. The connector circuit can be physically located at the splitter pad 3, as shown at reference numeral 7, which will usually be on a telephone or power pole or in a telephone terminal type weatherproof housing at ground level and has the advantage that is has the best visibility and thus would discourage tampering. The connector circuit could alternatively be connected within the subscriber's home at the place where the cable enters, e.g., in the basement or in a utility cabinet, as shown by reference numeral 8.

Figure 2:
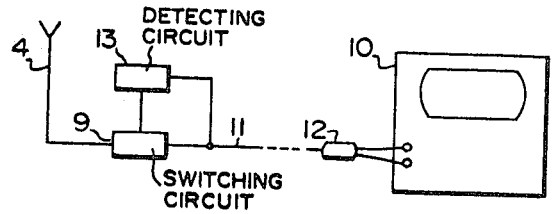

FIG. 2 shows a block schematic of the invention. A subscriber drop 4 carries the broadcast signal which is applied via signal inhibiting or switching circuit 9 and a length of feeder cable 11 to the subscriber's set 10 or security device to which the subscriber's set is connected. Typically the subscriber drop and feeder cable are comprised of coaxial cable, for CATV having a 75 ohms characteristic impedance. The coaxial cable is applied through an impedance matching transformer 12 which raises the impedance to 300 ohms for application to the 300 ohms antenna input terminals of a typical television set. However the transformer is deleted if the television set or a security device has a 75 ohm antenna input impedance.

A detecting circuit 13 is connected to the feeder cable 11 for detecting an abnormal impedance at the subscriber's set. Upon detection of the abnormal impedance, e.g., the opening of the feeder cable by which the d.c. path through the transformer or antenna circuit of the subscriber set is open circuited, the detecting means operates the inhibiting or switching circuit 9 to open-circuit the subscriber drop, thus stopping the provision of broadcast signals to the subscriber's set.

Figure 3:
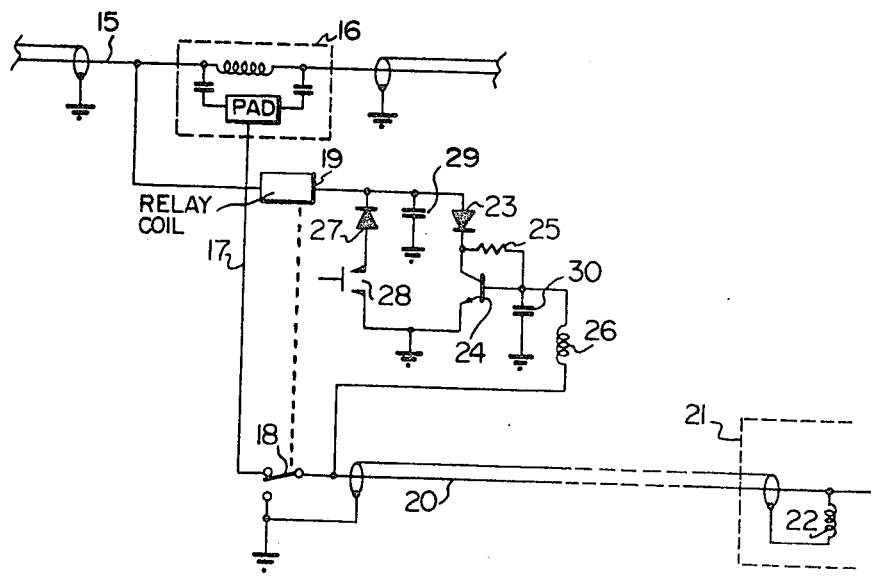

A detailed schematic of the preferred form of the invention is shown in FIG. 3.

The program distribution trunk 15 has a distribution splitter pad 16 of well-known construction connected to it, whereby the signal is tapped for provision to the local subscriber. The trunk used in this embodiment is typically coaxial cable. The subscriber drop 17 connected to the splitter pad is connected in series with a switch 18 which is operated by an associated relay coil 19, and via coaxial cable 20 to the subscriber's set or security device 21. The coaxial cable 20 is terminated within the subscriber's set or security device by the antenna input circuit thereof, which is typically comprised of a radio frequency coil 22 connected between the center lead and shield of the coaxial cable via a cable connector or terminals (not shown).

It should be noted that an equivalent to the radio frequency coil which includes the d.c. path can be formed by the primary winding of a 75 ohm to 300 ohm transformer such as 12 in FIG. 2. For the present embodiment, it is important that there should be a d.c. path between the two conductors of the feeder line, e.g. the shield and center conductor of the coaxial cable 20.

It should also be noted that a radio frequency coil can be connected between the shield and center conductor of the coaxial cable at a location remote from the subscriber's set, e.g. where the coaxial cable exits a wall or floor in the subscriber's home, etc. In this case the radio frequency coil forms an auxiliary termination, which will allow the subscriber to disconnect his television set at will, without disturbing the connector circuit of the present invention. Yet interruption of the d.c. path as when a subscriber cuts the coaxial cable in his basement to install a splitter pad will cause the circuit to operate, shutting off the program provision to the subscriber.

Relay coil 19 is connected to the program distribution trunk 15, for power. The other terminal of relay coil 19 is connected to the anode of diode 23, which has its cathode connected to the collector of an npn transistor 24, which itself has its emitter grounded. A bias resistor 25 is connected between the base and collector of the transistor. The base of the transistor is connected through radio frequency coil 26 to the center lead of coaxial cable 20.

Relay coil 19 is also connected to the cathode of a second diode 27, which has its anode connected through pushbutton or key operated switch 28 to ground.

Capacitors 29 and 30 are respectively connected between the junction of the diodes 23 and 27 to ground and between the base of transistor 24 to ground, for voltage spike protection.

It should be noted that diode 23 is connected in the same conductive direction as the emitter-base junction of transistor 24. If a pnp transistor is desired to be used, diode 23 should be reversed in its polarity, as well as diode 27.

Switch 18 operated by relay coil 19 preferably is a magnetically latched single pole double throw type, having one fixed contact connected to subscriber drop 17 and the other fixed contact connected to ground. The moving contact is connected to the center conductor of coaxial cable 20. Since it is magnetically latched in this embodiment, once it is operated, it will maintain its moving contact closed to either one or the other contacts without further application of power.

The program distribution trunk 15 normally carries power for operation of its repeaters, the power being of a.c. form. This power is utilized by the relay coil to operate.

Assuming that the subscriber's set or auxiliary termination is connected as shown, with the relay contact 18 in the position shown, programs are fed from the program distribution trunk 15 via subscriber drop 17, contact 18, coaxial cable 20 to radio frequency coil 22, which presents a high impedance to the program signals but includes a d.c. path, to the detecting circuit. The radio frequency coil 22 is connected via the shield of coaxial cable 20 to ground, the return path.

A d.c. path exists between the base of transistor 24, through radio frequency coil 26, the center conductor of coaxial cable 20, the radio frequency coil 22, the shield of coaxial cable 20, to ground. Since the emitter of transistor 24 is also connected to ground, the emitter-collector circuit of transistor 24 is maintained essentially non-conducting, since both sides of its base-emitter junction are connected to the same ground.

However, if the coaxial cable 20 is disconnected from the antenna terminals of the security device or subscriber's set 21, as would occur during tampering, the d.c. path through the radio frequency coil 22 is broken. Consequently the base of transistor 24 is no longer connected to ground and the base-emitter junction is forward biased due to current which passes through bias resistor 25. The emitter-collector circuit of transistor 24 is thus switched on, and current passes through diode 23, through the transistor to ground. This current is supplied by the positive-going pulses of the a.c. supply carried by the program distribution trunk 15, which pulses pass through relay coil 19, thus causing it to operate and latch in the opposite direction. The moving contact of relay switch 18 thus moves to the other contact which is connected to ground. Accordingly the center wire of coaxial cable 20 is connected to ground, and is maintained at that position due to the magnetic latching of realy coil 19. At the same time the program supply is cut off, since the subscriber drop 17 is split.

When the subscriber reconnects the coaxial cable to the security device or to his subscriber's set, a d.c. path is re-established through radio frequency coil 22, which results in transistor 24 switching off and maintaining its previous idle condition, but since relay 19 has in the meantime operated and latched, the moving contact does not reconnect to the terminal connected to the subscriber drop 17, and no program signals are available to the subscriber's set via the subscriber drop.

Usually the subscriber will telephone the cable operator, complaining that service has been interrupted. The cable operator sends a technician to the residence, and can investigate the reason for the opening of the d.c. path from the coaxial cable to the security device or subscriber's set.

To re-establish service, the technician need merely momentarily close pushbutton switch 28. The pushbutton can be hidden within the connector circuit housing, or be operated by a key switch. A circuit is established from ground through switch 28, diode 27, and relay coil 19 to the program distribution trunk 15. Due to the conductive direction of diode 27, now the negative pulses of the a.c. power signal carried by the program distribution trunk 16 pass through relay coil 19, causing it to operate and latch in the opposite direction to its previous condition. Relay contact 18 thus closes to the position shown in FIG. 3, reestablishing the connection of coaxial cable 20 to subscriber drop 17. Since the relay latches, the service is maintained continuous.

It should be noted that transistor 24 can be operated if the d.c. resistance between its base and ground rises above a predetermined threshold. The circuit could also be designed by a person skilled in the art to operate relay 19 if the resistance between the base of the transistor and ground becomes less than a predetermined threshold, as might occur should the subscriber tamper with the apparatus by connecting a plurality of subscriber's sets in parallel.

Other forms of circuits could be designed alternative to the one described, by a person understanding the principles of this invention. For example, a circuit using a silicon controlled rectifier in series with relay 19 could be used, or other forms of switching than relays could be used with an appropriate operation circuit, e.g., CMOS switches. The switches or circuits can also be latched using well known alternative latching techniques.

Should a source of a.c. power not be available from the program distribution trunk, or should it be undesirable to utilize it if it is available, a local alternating current power supply could be provided. In another embodiment of a local d.c. supply or d.c. supply with a rechargeable battery can be used, with an appropriately designed operation circuit.

A person skilled in the art understanding this invention may now conceive of changes, additions, or other embodiments of the invention, using the principles described herein. All are believed to be within the sphere and scope of the invention as defined in the claims appended hereto.

What is claimed is:

1. A connector circuit for an R.F. line signal feed to a subscriber port, comprising a pair of conductors adapted to be connected to a pair of terminals of a security device or subscriber's set which has an input impedance between said terminals which includes a direct current path and a predetermined load impedance to signal frequencies, means for connecting one of said conductors to a source of common potential, means for applying an R.F. signal to the other of said conductors, means for applying a rectified A.C. current via said other of the conductors for passage through the direct current path, means for detecting interruption of the rectified A.C. current in the event of disconnection of at least one of said terminals from the connector, and means for switching and latching the R.F. signal, but not the rectified A.C. current, off from said other conductor upon said detection of the interruption of said rectified A.C. current.

2. A connector circuit as defined in claim 1 in which said switching and latching means is adapted to maintain the inhibition of the application of said R.F. line signal from said other conductor upon subsequent restoration of said direct current path across said cable.

3. A connector circuit as defined in claim 2 further including resetting means in the direct current path for restoring the application of the R.F. line signal to said other conductor.

4. A connector circuit as defined in claim 3 further including a manually operable switch connected to the resetting means for generating said restoration signal, thereby causing the restoration of the application of said line signal to said cable.

5. A connector circuit as defined in claim 1, in which said means for applying and means for switching are comprised of a magnetically latching relay means.

6. A connector circuit as defined in claim 1 or 5 in which the switching means includes means for further connection of said other conductor to common potential.

7. A connector circuit as defined in claim 1, including a transistor, the base of the transistor connected via low pass filter means to said other conductor, the emitter of the transistor connected to common potential, a bias resistor connected between the base and the emitter of the transistor, the collector of the transistor connected via a first diode poled in the same direction as the emitter-base junction of the transistor to the coil of a latching relay, the relay further connected to a source of alternating current, a second diode connected between the junction of the first diode and common potential via a switch, the second diode being oppositely poled relative to the first diode, said other conductor being connected via a contact pair of said relay to a signal source having a frequency higher than the passband of the filter, whereby the relay is operated and held latched with its contact pair closed to feed said signal to said other terminal when a d.c. path exists between said pair of terminals and upon at least momentary closure of said switch, but is operated and held latched with its contact pair retained opened by conduction of said transistor when a d.c. path does not exist between said pair of terminals.

8. A wired distribution system connector for disconnection of signals upon detection of an impedance disturbance at a security device or subscriber's set connected to a subscriber set port, comprising means for applying first and second signals to said port, a disconnect switching means powered by said second signal, means for detecting said impedance disturbance in excess of a predetermined threshold appearing across said port, and means for operating and latching said disconnect switch means upon detection of said impedance disturbance to disconnect said first signal from said port.

9. In a CATV distribution system, a CATV feeder trunk for carrying A.C. power and CATV signal, a plurality of subscriber drops connected to the trunk via individual connector circuits, each of said connector circuits being further connected to a security device or television set antenna terminals having a D.C. path and predetermined impedance to CATV signals therebetween, each of said connector circuits including a CATV signal transmission path to said antenna terminals through a latching switch means, means for receiving said A.C. power from the trunk, means for half wave rectifying the A.C. power, applying it to said terminals for passage via the D.C. path, and for powering said latching switch means, means for detecting at least momentary disconnection of the security device or television set antenna terminals and means for operating said latching switch means to open said CATV signal path upon detection of said at least momentary interruption.

10. In a CATV distribution system as defined in claim 9, the combination including a latching switch enabling means in series with a first diode in the D.C. path for detecting said interruption and rectifying the A.C. power, a second diode poled oppositely to the first diode in series with a momentary reset switch connected in parallel with the first diode for unlatching the switch enabling means upon operation of the reset switch.

11. In a CATV distribution system as defined in claim 10, the latching switch enabling means comprising a relay coil of a magnetic latching relay, having a contact pair in series with said CATV signal path.

* * * * *